United States Patent
Buisson et al.

(10) Patent No.: US 6,676,199 B2
(45) Date of Patent: Jan. 13, 2004

(54) LIGHTWEIGHT VEHICLE FLOORING ASSEMBLY

(75) Inventors: Claude Buisson, Conflans Sainte Honorine (FR); Jean Casuli, Mantes la Ville (FR); Virginie Auger, Poissy (FR); Igor Bessin, Aubergenville (FR)

(73) Assignee: Rieter Automotive (International) AG, Zollikon (CH)

( * ) Notice: Subject to any disclaimer, the term of this patent is extended or adjusted under 35 U.S.C. 154(b) by 10 days.

(21) Appl. No.: 10/257,832

(22) PCT Filed: May 28, 2001

(86) PCT No.: PCT/CH01/00330

§ 371 (c)(1), (2), (4) Date: Feb. 11, 2003

(87) PCT Pub. No.: WO01/92086

PCT Pub. Date: Dec. 6, 2001

(65) Prior Publication Data

US 2003/0151274 A1 Aug. 14, 2003

(30) Foreign Application Priority Data

May 29, 2000 (CH) .............................................. 1081/00

(51) Int. Cl.[7] .................................................. B60J 7/00
(52) U.S. Cl. .............................. 296/193.07; 428/317.9; 52/403.1
(58) Field of Search .......................... 296/193.07, 181; 428/317.9, 316.6, 327, 159, 156, 319.9, 167, 116, 95, 172; 52/403.1, 309.4

(56) References Cited

U.S. PATENT DOCUMENTS

| | | | | |
|---|---|---|---|---|
| 1,736,548 A | * | 11/1929 | Pye | 296/193.07 |
| 1,776,510 A | * | 9/1930 | Keys et al. | 296/193.07 |
| 3,816,234 A | * | 6/1974 | Winfield | 428/317.9 |
| 4,384,020 A | | 5/1983 | Beggs et al. | |
| 4,502,234 A | * | 3/1985 | Schaefer et al. | 428/316.6 |
| 4,547,245 A | * | 10/1985 | Colyer | 428/327 |
| 4,698,253 A | * | 10/1987 | Osawa | 428/159 |
| 4,709,781 A | * | 12/1987 | Scherzer | 428/317.9 |
| 4,839,397 A | * | 6/1989 | Lohmar et al. | 428/316.6 |
| 4,966,799 A | * | 10/1990 | Lucca et al. | 428/319.9 |
| 5,013,597 A | * | 5/1991 | Kracke | 428/159 |
| 5,016,413 A | * | 5/1991 | Counihan | 52/403.1 |
| 5,187,905 A | * | 2/1993 | Pourtau et al. | 52/309.4 |

(List continued on next page.)

FOREIGN PATENT DOCUMENTS

| | | | |
|---|---|---|---|
| DE | 3002082 | * | 7/1981 |
| DE | 35010722 | * | 9/1986 |
| DE | 37 12882 | * | 11/1988 |
| DE | 42 32 953 | | 10/1993 |
| EP | 0 248 199 | * | 12/1987 |
| JP | 4 86261 | * | 3/1992 |
| JP | 05050951 | | 3/1993 |

*Primary Examiner*—Kiran Patel
(74) *Attorney, Agent, or Firm*—Nath & Associates PLLC; Gary M. Nath

(57) ABSTRACT

The invention provides a lightweight vehicle flooring assembly, wherein a carrier layer (1) has a layered structure. This structure comprises a honeycomb-like core layer (7) which can be made of a suitably impregnated cardboard material and which is connected on both sides to a stiffening layer (8, 9). The inner stiffening layer (8) is made of an SMC-material, whilst the outer stiffening layer (9) is made of a needled, preferably open-celled or porous nonwoven, also suitably impregnated against humidity and dirt. The structure of the carrier layer (1) and, in particular, the sequence of the layers: skin, honeycomb structure, nonwoven is of particular significance for the mechanical stability of the carrier layer (1). The carrier layer (1) is provided with an inner and an outer lining, the inner lining comprising a PU-foam spring layer (10) and a rubber or latex mass layer (11). These inner and outer linings, by choice of suitable materials and configurations, can provide acoustically absorbent insulation systems for the vehicle flooring assembly.

12 Claims, 1 Drawing Sheet

U.S. PATENT DOCUMENTS

| | | | | |
|---|---|---|---|---|
| 5,350,619 A | * | 9/1994 | Rasmussen | 428/167 |
| 5,395,673 A | * | 3/1995 | Hunt | 428/156 |
| 5,460,865 A | * | 10/1995 | Tsotsis | 428/116 |
| 5,497,590 A | * | 3/1996 | Counihan | 52/403.1 |
| 5,518,796 A | * | 5/1996 | Tsotsis | 428/116 |
| 5,567,497 A | * | 10/1996 | Zegler et al. | 428/95 |
| 5,863,091 A | * | 1/1999 | Shepherd et al. | 296/181 |
| 5,867,957 A | * | 2/1999 | Holtrop | 52/403.1 |
| 5,906,082 A | * | 5/1999 | Counihan | 52/403.1 |
| 6,127,021 A | * | 10/2000 | Kelman | 428/172 |

* cited by examiner

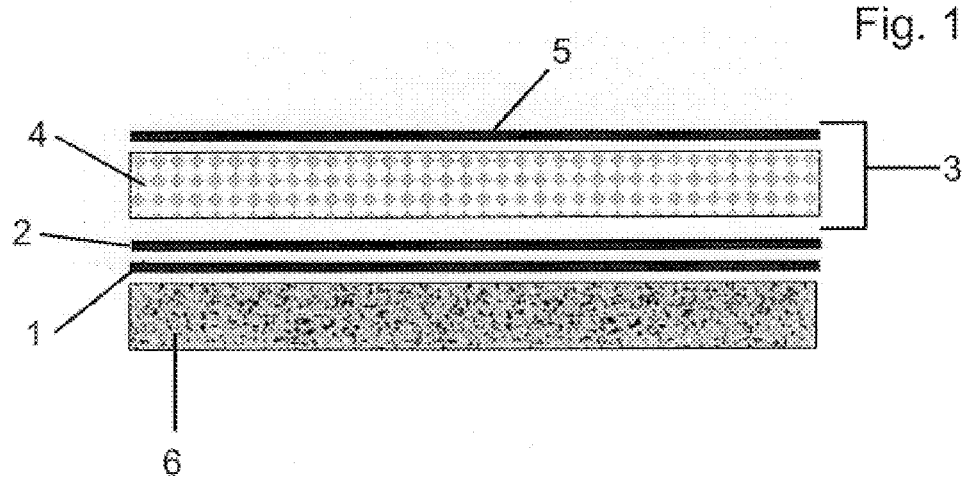
Fig. 1
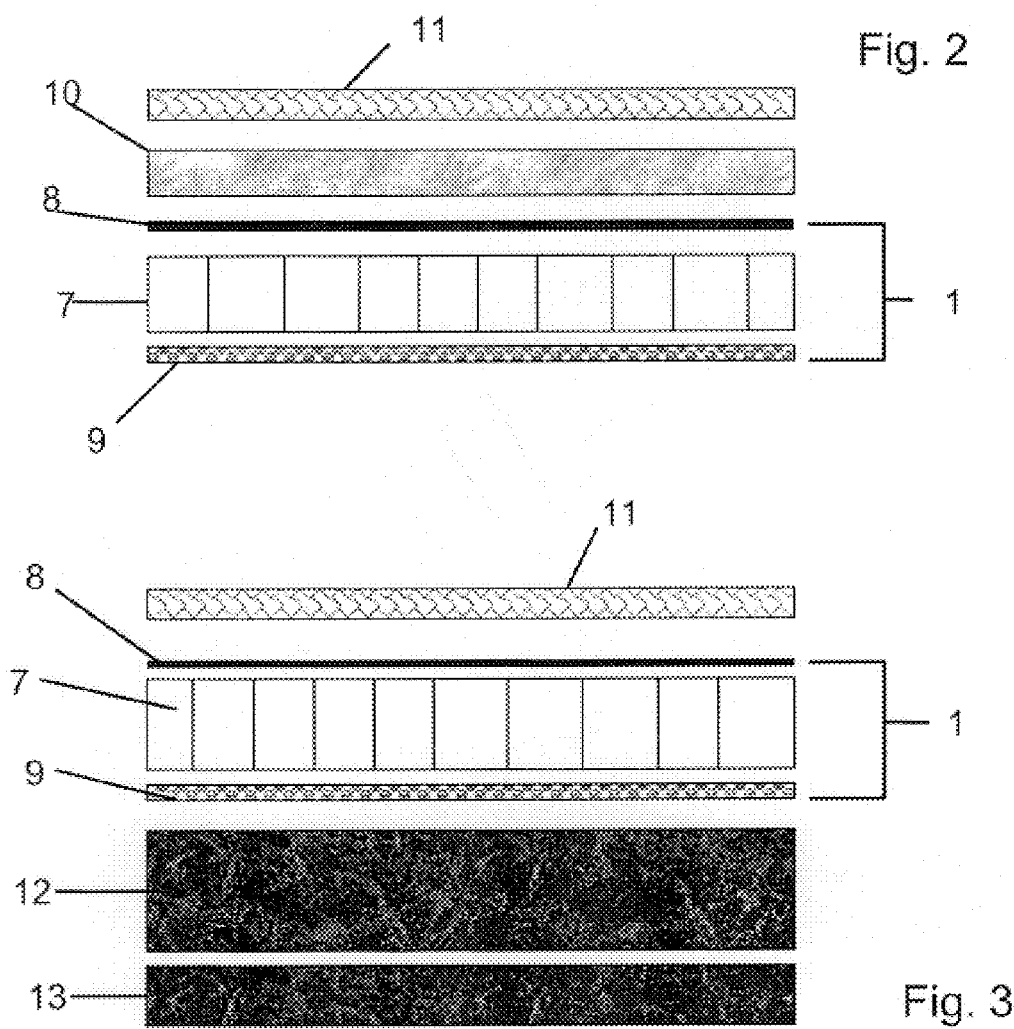
Fig. 2
Fig. 3

LIGHTWEIGHT VEHICLE FLOORING ASSEMBLY

The present invention concerns an assembly for a lightweight vehicle flooring according to the preamble of claim 1.

It is known to equip vehicle floor panels with an acoustically effective, i.e. sound insulating and/or sound absorbing lining. As a rule these linings comprise a sound insulating damping layer which is applied directly on to the floor panel. In high-comfort vehicles, an additional sound absorbing foam or nonwoven layer and a heavy and airtight carpet layer is added on to this vibration damping and sound absorbing layer on the passenger compartment side. These additional layers are acoustically designed in such a manner, that they can interact with each other as an acoustic spring-mass-system.

It is also known to apply a protective layer to the outer side of the floor panels with the aim of mechanically and/or chemically protecting it from, for example, the impact of stones or the effects of salt in winter. Such an underbody protection usually comprises spraying on an approximately 1 mm thick and relatively expensive layer of PVC It has been shown that the application of a number of layers and coatings having differing functions undesirably increases the total weight of the vehicle and also undesirably reduces the available space in the passenger compartment, in particular the foot space. However, it is the general aim of the modern vehicle industry to design lighter, roomier and more cost efficient vehicles.

It is therefore the aim of the present invention to provide a vehicle flooring which is lighter and less expensive than previous vehicle flooring configurations, whilst at the same time meeting the given mechanical, thermal and acoustical requirements This is achieved with a lightweight vehicle flooring assembly having the features of claim 1, and in particular with a lightweight vehicle flooring assembly in which the conventional floor panel is replaced with a carrier layer comprising a honeycomb-like core layer which is connection on both sides with a stiffening layer. In a first preferred embodiment, the inner side of the stiffening layer is made of an SMC-material, the honeycomb-like core layer is made of an impregnated cardboard material, and the outer side of the stiffening layer is made of a needled nonwoven or felt. This felt is preferably made of glass and PET fibers which are bonded with 25% Resol, and has a weight of 1.3 kg/m$^2$, for example. It is essential for the vehicle flooring according to the invention that at least this outer-side stiffening layer is open pored. In order to improve the acoustic efficiency, a double felt having two differently compressed sheets can additionally be applied. In this embodiment the inner lining consists of an acoustic spring-mass-system which preferably comprises a spring layer made of PU-foam and a mass layer made of rubber or latex.

In a further embodiment of the lightweight vehicle flooring according to the invention the carrier layer is provided with an outer coating which comprises two differently compressed felts. These open pored, i.e. porous and air pervious fiber layers can additionally be protected against humidity and dirt by a thin rubber or latex layer. On its inner side the carrier layer comprises a sound insulating rubber or latex layer. In its stead, an SMC-layer or an impregnated Renfort-layer can also be used.

Further preferred embodiments show the features of the dependent claims.

In this way, an acoustically and thermically highly efficient lightweight vehicle flooring is provided which is substantially lighter than conventional systems. The assembly according to the invention can be easily manufactured and formed, preferably in a one-step process, and in particular the vehicle flooring can be partially shaped into a Ω-form in order to achieve the required stiffness. The lightweight vehicle flooring according to the invention is particularly suitable for use in the cabin flooring of trucks. It is understood that this flooring assembly can also be used for other vehicle parts, in particular for cabin side elements or other floor elements.

The invention is to be described in more detail with the aid of the drawings and a description of preferred embodiments.

FIG. 1 shows a schematic view of a conventional vehicle floor;

FIG. 2 shows a lightweight floor according to the invention with an acoustical spring-mass-System;

FIG. 3 shows a lightweight floor according to the invention with an acoustically absorbent insulation system.

A conventional vehicle floor shown schematically in FIG. 1 comprises carrier layer 1 in the form of a metallic floor sheet, which typically weighs 7, 8 kg/m$^2$ and is approximately 1 mm thick. An IFF-layer 2 is applied on to the inner side of this metallic floor sheet, this IFF-layer typically weighing 4, 8 kg/m$^2$ and being 2 mm thick. On this IFF-layer 2 lies a carpet 3 having a carpet under-layer 4 and a carpet upper-layer 5. Such carpets generally weigh 8 kg/m$^2$ and are usually 20 mm thick. On the outer side of the metallic floor sheet there is applied a sound insulation layer 6, which generally weighs 2, 4 kg/m$^2$ and is 25 mm thick. Therefore, this vehicle floor has a total weight of 23 kg/m$^2$ and a total thickness of 48 mm.

In comparison the lightweight vehicle floor according to the invention and as shown schematically in FIG. 2 has a total weight of 12 kg/M$^2$ a total thickness of 46 mm. The embodiment shown in FIG. 2 has a carrier layer 1 comprising a layered structure, in the following known as RHOC. This layered structure consists of a honeycomb-like core layer 7, which is connected on both sides to a stiffening layer 8, 9. The inner stiffening layer 8 is made of an SMC-material. A cardboard material is used for the honeycomb-like core layer 7, which is treated with a Resol-solution for achieving the required protection against humidity. The outer stiffening layer 9 is made of a needled nonwoven (preferably consisting of glass fibers and PET), which is also impregnated with a Resol-solution (a watery phenol-solution). This thin nonwoven 9 preferably comprises glass-fibers and PET-fibers which are bonded with Resol. The nonwoven 9 is preferably open-celled or porous. In order to further improve the acoustic properties, it is also possible to provide an additional nonwoven layer having two differently compressed sheets. The structure of the carrier layer 1, and in particular the sequence of the layers: skin, honeycomb structure, nonwoven, is of particular significance for the mechanical stability of the carrier layer 1. The required stiffness or rigidity results from the total thickness. Furthermore, the core layer 7, which essentially contains only air, allows for a good thermic insulation. In a preferred embodiment, the carrier layer 1 has a weight of 5 kg/m$^2$ and a thickness of 23 mm. In order to further improve the acoustic efficiency of this lightweight structure, the inner lining is designed as a spring-mass-system. In a preferred embodiment this comprises a spring layer 10 made of PU-foam and a mass layer 11 made of rubber. The spring layer 10 preferably weighs 1 kg/m$^2$ and is preferably 20 mm thick. The mass layer 11 preferably weighs 6 kg/M$^2$ and is preferably 3 mm thick. In this way, it is possible to create a vehicle floor having the previously described layer sequence, the individual layers having a total weight of 12 kg/m² and a total thickness of 46 mm.

FIG. 3 shows an alternative embodiment of the vehicle floor according to the invention. This also comprises a carrier layer 1 as previously described as an RHOC-layer. On its outer side, this carrier layer 1 is provided with two differently compacted or compressed fibrous nonwoven layers, a first, less compacted fibrous nonwoven layer 12 having an area weight of 1.6 kg/m² and a thickness of 17 mm, and a second, more highly compacted fibrous nonwoven layer 13 having an area weight of 1 kg/m² and a thickness of 4 mm. These porous and air permeable fiber layers can be additionally protected with a thin rubber or latex layer against dirt and humidity. On the inner side, a rubber or latex layer 11 is arranged over the carrier layer 1, weighing 6 kg/m² and having a thickness of 3 mm. This embodiment of a vehicle floor, comprising the previously described layer structure and having an RHOC layer of 5 kg/m² weight and 23 mm thickness, therefore has a total weight of 13.6 kg/m² and a total thickness of 46 mm. It is essential for the acoustic properties of the vehicle floor according to the invention that the underside of the floor is open pored. Instead of the rubber layer 11 it is possible to use an SMC-layer or an impregnated Renfort-layer. This Renfort-layer can comprise glass fibers, carbon fibers, Kevlar fibers, natural fibers etc. and comprises polyester-vinylester, epoxy or other suitable materials known to the expert as a binding agent.

The inner lining is designed as an acoustic spring-mass-system, and in particular comprises a spring layer 10 made of a PU-foam and a mass layer 11 made of rubber or latex.

In an advantageous embodiment, the core layer 7 has a thickness of about 15 to 30 mm, in particular 22 mm, a cell size of about 5 to 15 mm, in particular 10 mm, a compression resistance of about 450 to 1000 kPa, in particular 700 kPa, and an area weight of about 500–1100 g/m², in particular 800 g/m².

It is understood that the present core layer 7, which can for example be made of cardboard, permits the manufacture of an extremely inexpensive product. It is, however, possible to use a foam having a high proportion of large and open cells instead of the honeycomb-like structure. In order to impregnate the core layer 7 and the needled fiber-nonwoven layers 12, 13, melamine resins, polyester, vinyl-ester or epoxy resins can be used instead of a Resol-solution. For treating the honeycomb-like structure it is equally possible to use latex or a variety of paraffin or Teflon® products.

Because duroplastic materials are more suitable than thermoplastic materials for the stiffening layer, the expert will pay heed to the temperature resistance when selecting the material for the core layer. Other materials can also be used for the core layer, such as aluminium or Nomex® (registered Trademark of DuPont).

What is claimed is:

1. Vehicle floor assembly having a carrier layer (1), which is provided with an inner lining and an outer lining, wherein the carrier layer (1) comprises a honeycomb-like core layer (7), which is connected on both sides with a stiffening layer (8, 9), whereby the outer stiffening layer (9) is open-pored.

2. Vehicle floor assembly according to claim 1, wherein the inner lining is an acoustic spring-mass-system, and in particular comprises a spring layer (10) made of a PU-foam and a mass layer (11) made of a rubber or latex material.

3. Vehicle floor assembly according to claim 1, wherein the outer lining is an acoustically absorbent insulation system, and in particular comprises two differently compressed fibrous nonwoven layers (12, 13).

4. Vehicle floor assembly according to claim 3, wherein the more highly compressed fibrous nonwoven layer (12) is arranged between the carrier layer (1) and the less compressed fibrous nonwoven layer (13).

5. Vehicle floor assembly according to claim 1, wherein the core layer (7) is made of a duroplastic material.

6. Vehicle floor assembly according to claim 1, wherein the core layer (7) is made of a cardboard-like material.

7. Vehicle floor assembly according to claim 1, wherein the core layer (7) has a thickness of about 15 to 30 mm, in particular 22 mm, a cell size of about 5 to 15 mm, in particular 10 mm, a compression resistance of about 450 to 1000 kPa, in particular 700 kPa, and an area weight of about 500–1100 g/m², in particular 800 g/m².

8. Vehicle floor assembly according to claim 1, wherein the core layer (7) is impregnated with a Resol-solution.

9. Vehicle floor assembly according to claim 1, wherein the stiffening layer (9) is made of a needled nonwoven, and in particular comprises glass or PET fibers which are bonded in particular with Resol.

10. Vehicle floor assembly according to claim 1, wherein said assembly is at least partially arranged in a Ω-form.

11. Vehicle floor assembly according to claim 1 and designed as cabin flooring, in particular for trucks.

12. Vehicle comprising a vehicle floor assembly according to claim 1.

* * * * *